US007664922B2

(12) United States Patent
Ohtsuka et al.

(10) Patent No.: US 7,664,922 B2
(45) Date of Patent: Feb. 16, 2010

(54) DATA TRANSFER ARBITRATION APPARATUS AND DATA TRANSFER ARBITRATION METHOD

(75) Inventors: Katsushi Ohtsuka, Chiba (JP); Nobuo Sasaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 112 days.

(21) Appl. No.: 11/431,965

(22) Filed: May 11, 2006

(65) Prior Publication Data

US 2007/0016732 A1 Jan. 18, 2007

(30) Foreign Application Priority Data

May 12, 2005 (JP) ............................. 2005-139666

(51) Int. Cl.
*G06F 12/00* (2006.01)
(52) U.S. Cl. ................... 711/158; 711/4; 711/5; 711/100; 711/102; 711/103; 711/111; 711/112; 711/114; 711/154; 711/157; 365/230.01; 365/230.03
(58) Field of Classification Search ............... 711/100, 711/157–158, 4–5, 102–103, 111–112, 114, 711/154; 365/230.01, 230.03, 49
See application file for complete search history.

(56) References Cited

U.S. PATENT DOCUMENTS

| | | | |
|---|---|---|---|
| 4,669,056 A | | 5/1987 | Waldecker et al. |
| 5,226,010 A | * | 7/1993 | Glider et al. ............ 365/189.04 |
| 5,404,166 A | * | 4/1995 | Gillard et al. ............ 348/390.1 |
| 5,408,673 A | * | 4/1995 | Childers et al. ............ 711/149 |
| 5,689,653 A | * | 11/1997 | Karp et al. .................. 712/222 |
| 5,923,839 A | * | 7/1999 | Munetoh et al. .............. 714/48 |
| 6,990,603 B2 | * | 1/2006 | Strasser .......................... 714/6 |
| 2002/0004880 A1 | | 1/2002 | Christenson |
| 2005/0120159 A1 | * | 6/2005 | Polizzi et al. .................. 711/1 |

FOREIGN PATENT DOCUMENTS

| | | |
|---|---|---|
| JP | 59068069 A | 4/1984 |
| JP | 2000010759 A | 1/2000 |

OTHER PUBLICATIONS

ISR and Written Opinion, Aug. 10, 2006.
Office Action for corresponding Japanese Application No. 2005-139666, dated Sep. 1, 2009.

* cited by examiner

*Primary Examiner*—Tuan V Thai
*Assistant Examiner*—Zhuo H Li
(74) *Attorney, Agent, or Firm*—Matthew B. Dernier, Esq.; Gibson & Dernier LLP (57) ABSTRACT

When a concentration of access requests on a specific bank occurs, the delay time is caused due to the competition among the accesses, thereby lowering the processing speed of an information processing apparatus as a whole. A data transfer arbitration unit 172 sequentially transfers data to be recorded to a memory controller 160 that records data in memory having a plurality of banks. A selector 174 selects any DMAC 170 from among a plurality of DMACs, irrespective of priority sequence of transfer service for the DMAC. A transmitter 176 transmits, to a control-side transfer unit 114, data requested to be transferred by the selected DMAC 170. The selector 174 selects consecutively the DMAC 170 so that the transfer service for the same DMAC is consecutively executed, and determines the number of consecutive selections so that a transfer across the banks of the DMAC 170 occurs by a plurality of the transfer services.

18 Claims, 7 Drawing Sheets

DATA TRANSFER ARBITRATION APPARATUS AND DATA TRANSFER ARBITRATION METHOD

BACKGROUND OF THE INVENTION

The present invention relates to technologies by which to transfer data to memories, and it particularly relates to a technology by which to transfer data to the memory having a plurality of banks.

Along with recent years' marked advance of computer graphics technology and image processing technology, which are used in the areas of computer games, digital broadcasting and the like, there is demand for information processing apparatuses, such as computers, game machines and televisions, to have the capacity to process image data of higher definition at higher speed. To meet such demand, it goes without saying that it is necessary to realize high speed of arithmetic processing itself, but it is just as important to efficiently execute memory access of arithmetic operation results or data for arithmetic operation.

There is a technology called "memory interleaving" as a method for executing memory access efficiently. As a prerequisite of a memory interleave system, memory is provided with a plurality of banks, which are the units controlled by a memory controller. Normally, when an access is made to a bank, a latency takes place after the access time, in which a read or write is done actually, before the next access becomes possible. This delay time occurs on account of the precharge characteristic of DRAM (Dynamic Random Access Memory) or such other restriction.

A memory interleave system, in which access to a next bank is started during the latency of a bank, has the merit of reduced effect of delay time and the resulting higher-speed of memory access.

However, even with a conventional memory interleave system, there may occur a concentration of access requests on a specific bank. In such a case, the processing performance of an information processing apparatus as a whole may drop under the influence of the delay time of the bank on which access requests have concentrated.

SUMMARY OF THE INVENTION

The present invention has been made to address the foregoing problem and an object thereof is to provide a technology for efficiently executing access to memory.

An embodiment according to the present invention relates to a data transfer arbitration apparatus in which data to be recorded are sequentially transferred to a memory controller that records data in memory having a plurality of banks.

This apparatus selects a data transfer requesting entity from among a plurality of data transfer requesting entities, irrespective of priority sequence of transfer service for the data transfer requesting entity, and transmits, to the memory controller, data requested to be transferred by the selected data transfer requesting entity. Then the data transfer requesting entity is consecutively selected so that the transfer service for the same data transfer requesting entity is consecutively executed, and the number of consecutive selections is determined so that a transfer across the banks of the memory occurs by a plurality of the transfer services. The steps taken in accordance with the aforementioned embodiment may also be employed as a process in a computer program stored in a recording medium, readable by a computer, where the program is operable to cause the computer to execute the process.

The phrase "irrespective of priority sequence" is such that it is only necessary to mean that the chances of providing the transfer service to the respective data transfer requesting entities are equalized as a result, instead of that it is set beforehand so that the transfer service is provided to a specific data transfer requesting entity in preference to the other data transfer requesting entities.

Another embodiment according to the present invention relates also to a data transfer arbitration apparatus in which data to be recorded are sequentially transferred to a memory controller that records data in memory having a plurality of banks.

This apparatus selects any data transfer requesting entity from among a plurality of data transfer requesting entities, according to priority sequence of transfer service determined for the plurality of data transfer requesting entities, and transmits, to the memory controller, data requested to be transferred by the selected data transfer requesting entity. Then, when the data transfer requesting entity requests another data transfer after having received a transfer service, the data transfer requesting entity after having received the transfer service is consecutively selected even if there exists a data transfer requesting entity which is supposed to receive a transfer service next time according to the priority sequence, and the number of consecutive selections is determined so that a transfer across the banks of the memory occurs by a plurality of the transfer services. The steps taken in accordance with the aforementioned embodiment may also be employed as a process in a computer program stored in a recording medium, readable by a computer, where the program is operable to cause the computer to execute the process.

The term "priority sequence" here may vary, in the execution of data transfer processing, among a plurality of data transfer requesting entities.

It is to be noted that those expressing the present invention by a method, an apparatus, a system, a recording medium, a computer program are also effective as the present embodiments.

DETAILED DESCRIPTION OF THE INVENTION

An outline of an entire information processing apparatus serving as an environment in which to realize the data transfer in the present embodiments will be described first and then a description will be given of functions related to the data transfer in the information processing apparatus.

Figure 1:
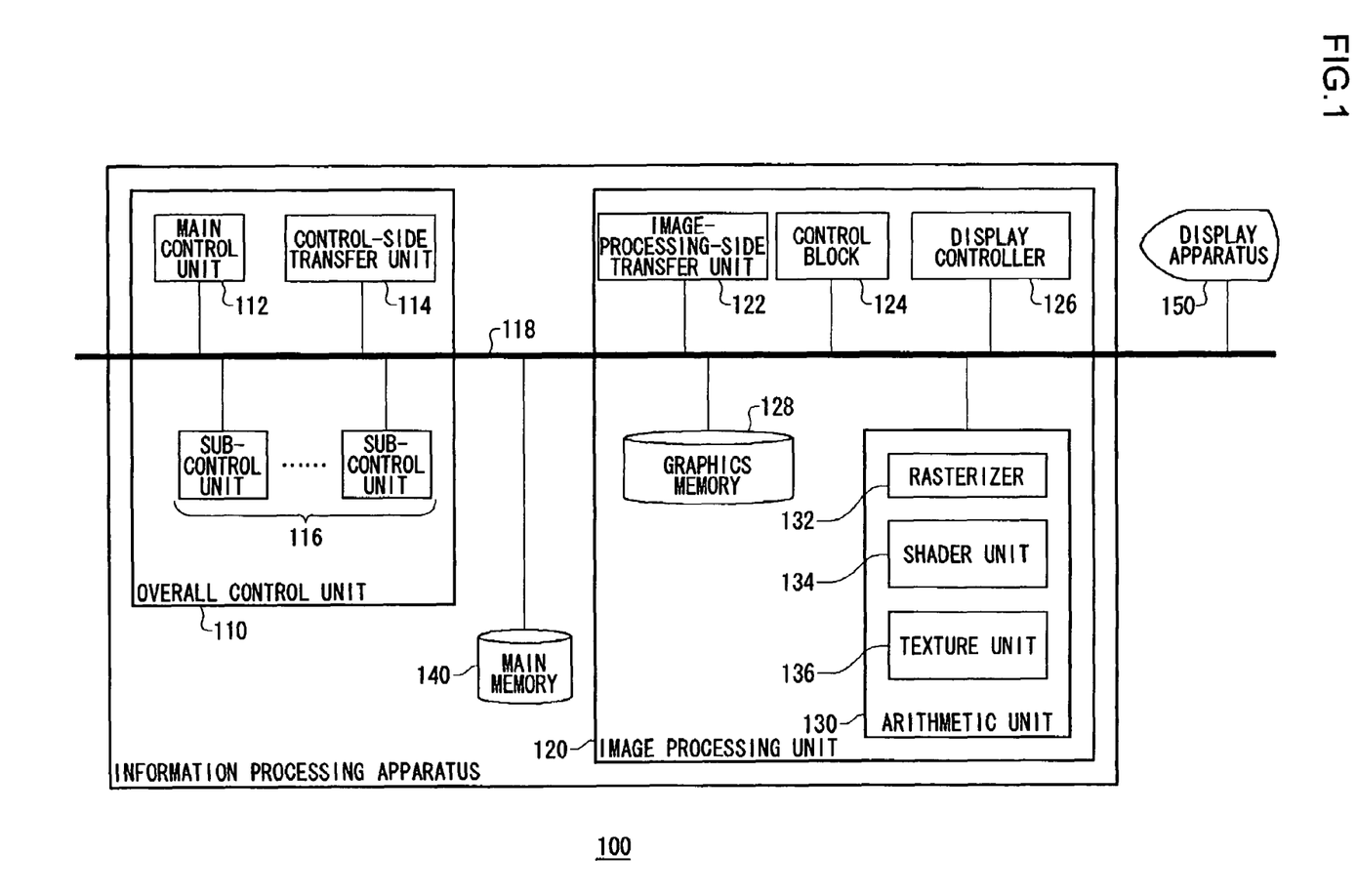
FIG. 1 is a function block diagram of an information processing apparatus.

FIG. 1 is a function block diagram of an information processing apparatus.

An information processing apparatus 100 includes an overall control unit 110, an image processing unit 120 and a main memory 140. The information processing apparatus 100 is connected to a display apparatus 150. The display apparatus 150 outputs the image or video that has been obtained as a result of processing by the overall control unit 110 and the image processing unit 120.

In terms of hardware, each element described, as a function block for carrying out a variety of processings, as shown in FIG. 1 and the like, can be realized by a CPU (Central Processing Unit), a memory and other LSI (Large Scale Integration). In terms of software, it is realized by memory-loaded programs or the like that have a function of reserved management. Thus, it is understood by those skilled in the art that these function blocks can be realized in a variety of forms such as by hardware only, software only or the combination thereof and are not limited to any of these in particular.

Executed in the information processing apparatus 100 is an operating system (hereinafter referred to simply as "OS") for providing functions and environment for efficient use of the information processing apparatus 100 and controlling the whole apparatus in a unified manner. A plurality of applications are executed on OS.

The overall control unit 110 includes a single main control unit 112 and a plurality of sub-control units 116 and control-side transfer unit 114. The sub-control units 116, the main control unit 112 and a control-side transfer unit 114 can communicate with one other via a bus 118. The main control unit 112 assigns tasks as the basic processing units of each application, to the respective sub-control units 116. Or the main control unit 112 may execute the tasks by itself. With the sub-control units 116 executing their respectively assigned tasks, a plurality of tasks are processed in parallel with one another.

Hereinbelow, the processings executed by the main control unit 112, including the task assignment processing, are called the "main process", and the processings executed by the sub-control units 116 are called the "sub-process". The main control unit 112 executes processings for controlling the overall information processing apparatus 100, such as a user-interface-related processing which has a relatively high priority. In contrast to this, the sub-control units 116 executes processings subcontracted from the main process, such as calculations executed in the background which has a relatively low priority.

The control-side transfer unit 114 controls data transfer between the main memory 140 and a graphics memory 128, data save and the like, by a command from the main control unit 112 or sub-control unit 116 or a request from the image processing unit 120.

The main memory 140 is a storage area used by the overall control unit 110 and the image processing unit 120. In the main memory 140, data related to the execution status of a task are stored. For example, modeling data obtained as a result of tasks concerning computer graphics processed by the overall control unit 110 are stored temporarily in the main memory 140. There are also cases where data generated by the image processing unit 120 are saved in this main memory 140.

The image processing unit 120 is a unit that exclusively executes image processing, for instance, rendering processing. The image processing unit 120 executes image processing, following the instructions from the overall control unit 110. The image processing unit 120 carries out image processing related to the respective tasks processed by the overall control unit 110 and outputs the generated images or videos to the display apparatus 150. The image processing unit 120 may time-share and execute a plurality of image processings parallelly.

The image processing unit 120 includes a graphics memory 128, an arithmetic unit 130, a display controller 126, a control block 124 and an image-processing-side unit 122. These units are connected with one another via the bus 118 and thus the units can communicate with one another.

The graphics memory 128 is a memory area for storing graphics data that are used and managed by the image processing unit 120. Provided in the graphics memory 128 are not only a frame buffer and a Z-buffer, where image frame data are stored, but also areas corresponding to data, such as vertex data, texture data and color lookup table, which are the basic data referred to at the rendering of image frame data.

The control block 124 is a block for controlling the image processing unit 120 as a whole. The control block 124 performs an overall control of the arithmetic unit 130, the graphics memory 128 and the display controller 126 and carries out synchronization management, timer management and the like of data transfer between the respective blocks.

The image-processing-side unit 122 controls the data transfer, data save and the like between the overall control unit 110 or the main memory 140 and the graphics memory 128, following a command from the control block 124.

The display controller 126 generates horizontal and vertical synchronization signals and loads, sequentially in a line, the pixel data of image frame data from a frame buffer stored in the graphics memory 128 according to the display timing of the display apparatus 150. Furthermore, the display controller 126 makes an output by converting the pixel data having been loaded in a line, from the digital data comprised of RGB color values, into a format corresponding to the display apparatus 150.

The arithmetic unit 130 carries out a variety of arithmetic processings concerning graphics, following the commands from the control block 124. One example of such processing may be a series of rendering processings of generating image frame data through coordinate transformation, hidden-surface elimination and shading based on three-dimensional modeling data and writing them into a frame buffer.

The arithmetic unit 130 includes such function blocks as a rasterizer 132, a shader unit 134 and a texture unit 136 in order to effect a high-speed processing of three-dimensional graphics in particular.

The rasterizer 132 receives the vertex data of a basic object to be rendered (hereinafter referred to as "primitive") from the overall control unit 110 and performs a view transformation of converting the primitive on a three-dimensional space into graphics on a rendering plane through a projection transformation. Furthermore, it carries out a raster processing of scanning the graphics on the rendering plane along the horizontal direction of the rendering plane and converting them column by column into quantized pixels. The primitive is pixel-expanded by this rasterizer 132, and the pixel information is calculated for each pixel. This pixel information includes RGB color values, $\alpha$ values indicating transparency, and Z values indicating depth from viewpoints.

The rasterizer 132 generates a pixel area of a predetermined size along the scan lines and outputs it to the shader unit 134 and the texture unit 136. The pixel areas outputted from the rasterizer 132 are once stacked into a queue, and the shader unit 134 processes the stacked pixel areas one by one.

The shader unit 134 carries out a shading processing based on the pixel information calculated by the rasterizer 132, determines the pixel colors after a texture mapping based on the texel information obtained by the texture unit 136, and writes the image frame data after the shading processing in a frame buffer in the graphics memory 128. Furthermore, the shader unit 134 performs processings, such as fogging and alpha blending, on the image frame data written into the frame buffer, determines final rendering colors, and updates the image frame data in the frame buffer.

The texture unit 136 receives parameters specifying texture data from the shader unit 134, reads out the requested texture data from a texture buffer in the graphics memory 128, and outputs them to the shader unit 134 after performing a predetermined processing thereon.

Upon receipt of basic information necessary for image generation, such as the vertex data of a primitive, or a start instruction for image generation from the overall control unit 110, the image processing unit 120 executes image processing independently of the overall control unit 110. The data generated by the image processing unit 120 are transferred to the graphics memory 128 and the main memory 140. There may be cases where the data stored in the graphics memory 128 are transferred to the main memory 140 by a request from the overall control unit 110 or an instruction from the image processing unit 120. When the image processing unit 120 transfers the data stored therein to the main memory 140, the image-processing-side transfer unit 122 transfers the data to the control-side transfer unit 114. Then the control-side transfer unit 114 records the received data in the main memory 140.

Figure 2:
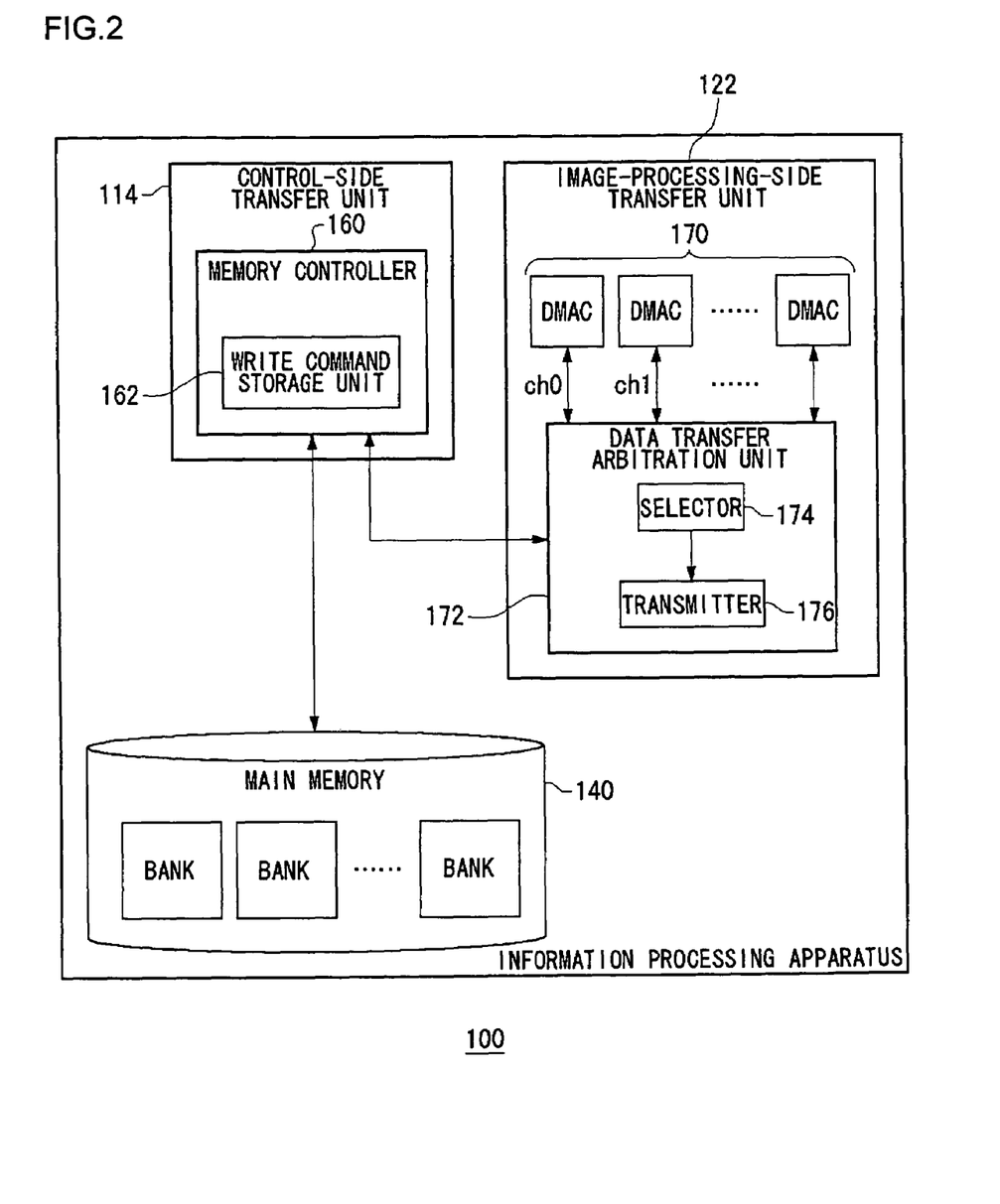
FIG. 2 is a function block diagram concerning data transfer from an image processing unit to a main memory.

FIG. 2 is a functional block diagram concerning data transfer from an image processing unit to a main memory.

An image-processing-side transfer unit 122 includes a plurality of DMACs (Direct Memory Access Controller) 170, which are to be the data transfer requesting entity, and a data transfer arbitration unit 172. In an image processing unit 120, data transfer requests from a plurality of paths are issued to the data transfer arbitration unit 172 via these DMACs 170. The path for data transfer request by each DMAC 170 is called a channel (hereinafter denoted as "CH" also). Hereinbelow, the description will be based on an assumption that these channels are four paths of CH0 to CH3. In this case, there are four DMACs 170.

A selector 174 of the data transfer arbitration unit 172 selects any one of CH0 to CH3. In other words, the selector 174 selects a DMAC 170 which is associated with any one of CH0 to CH3. The method of selection will be described in detail later. A transmitter 176 transmits data of a predetermined length whose transfer is requested by the selected DMAC 170 to a control-side transfer unit 114 via a bus 118. Hereinbelow, the size of data transferred at this time is called the "basic transfer size". The following explanation assumes, tentatively, that the basic transfer size is 128 bytes. Data transmitted includes address information for specifying a write destination in the main memory 140.

A memory controller 160 in the control-side transfer unit 114 writes data transferred from the data transfer arbitration unit 172 in the main memory 140, and the data write command is temporarily stored in a write command storage unit 162 of the memory controller 160. The write command storage unit 162 may be structured as a cache memory. The data transferred from the data transfer arbitration unit 172 is temporarily stored in the memory controller 160. The memory controller 160 takes out data write commands sequentially in a FIFO (First-In First-Out) method from the write command storage unit 162 and records the data that have been transferred to applicable addresses of the main memory 140. It is to be noted that the memory controller 160, while employing a FIFO method basically, can change as appropriate the order of taking out data write commands from the write command storage unit 162. This method will be described later as a "skipping method".

The main memory 140 includes a plurality of banks. Each bank, herein, is a physically independent memory cell. It is possible to issue an access request to another bank during the delay time of a bank. Hereinbelow, the explanation will be given on the assumption that the entry bit number for each bank is 128 bytes. Each bank has the addresses allotted for every 128 bytes. The address table 180 for each bank will be explained in relation to the next FIG. 3.

Figure 3:
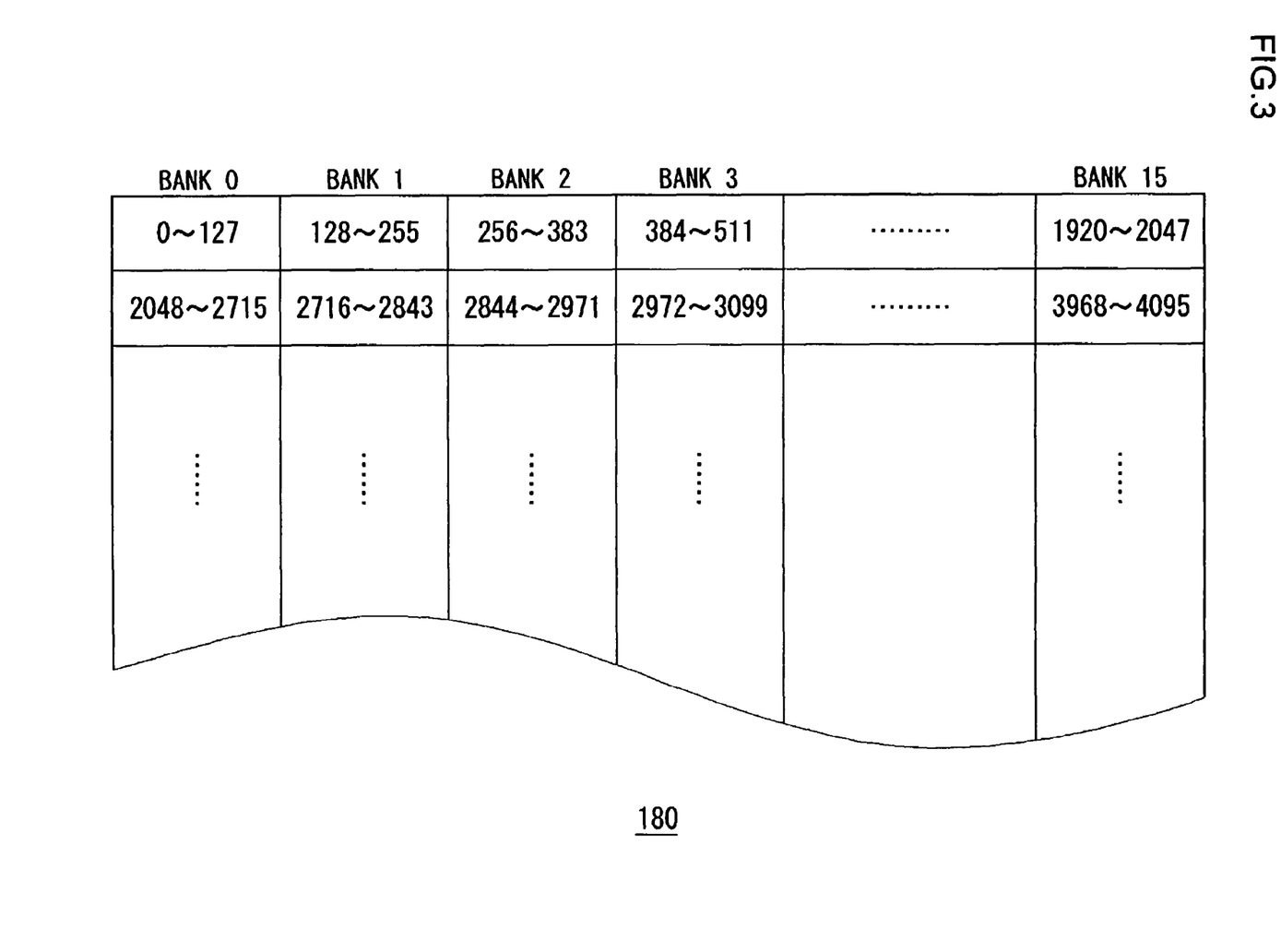
FIG. 3 is a data structure diagram of an address table in a main memory.

FIG. 3 is a data structure diagram of an address table in a main memory.

In the present embodiment, the main memory 140 has 16 banks. Hereinbelow, these 16 banks are called bank 0, bank 1, . . . and bank 15 for identification.

The 128 bytes of address 0 to 127 are allotted for bank 0, the 128 bytes of address 128 to 255 for bank 1, and so on. This way, the addresses are so allotted as to switch banks in units of 128 bytes. And for every 128 bytes×16 banks, or 2048 bytes, addresses are allotted again from bank 0. That is, the 128 bytes of address 2048 to 2715 are allotted for bank 0, the 128 bytes of address 2715 to 2843 for bank 1, and so on.

It is often the case that the addresses in the main memory 140 of data whose transfer is requested by a DMAC 170 are consecutive. In the light of a characteristic like this, allotment of addresses as shown in the address table 180 of FIG. 3 makes it easier to distribute the accesses to the respective banks. For example, after a receipt of the transfer of data whose write destination is bank 0, there is a higher possibility that the transfer of data in the order of bank 1 and bank 2 will follow. In such a case, a write to the bank 1 can be started even during the delay time of bank 0, so that memory access can be executed efficiently.

Next, a general method of memory access will be explained with reference to FIG. 4 and FIG. 5, and a method of memory access according to the present embodiment will be explained with reference to FIG. 6 and FIG. 7.

Figure 4:
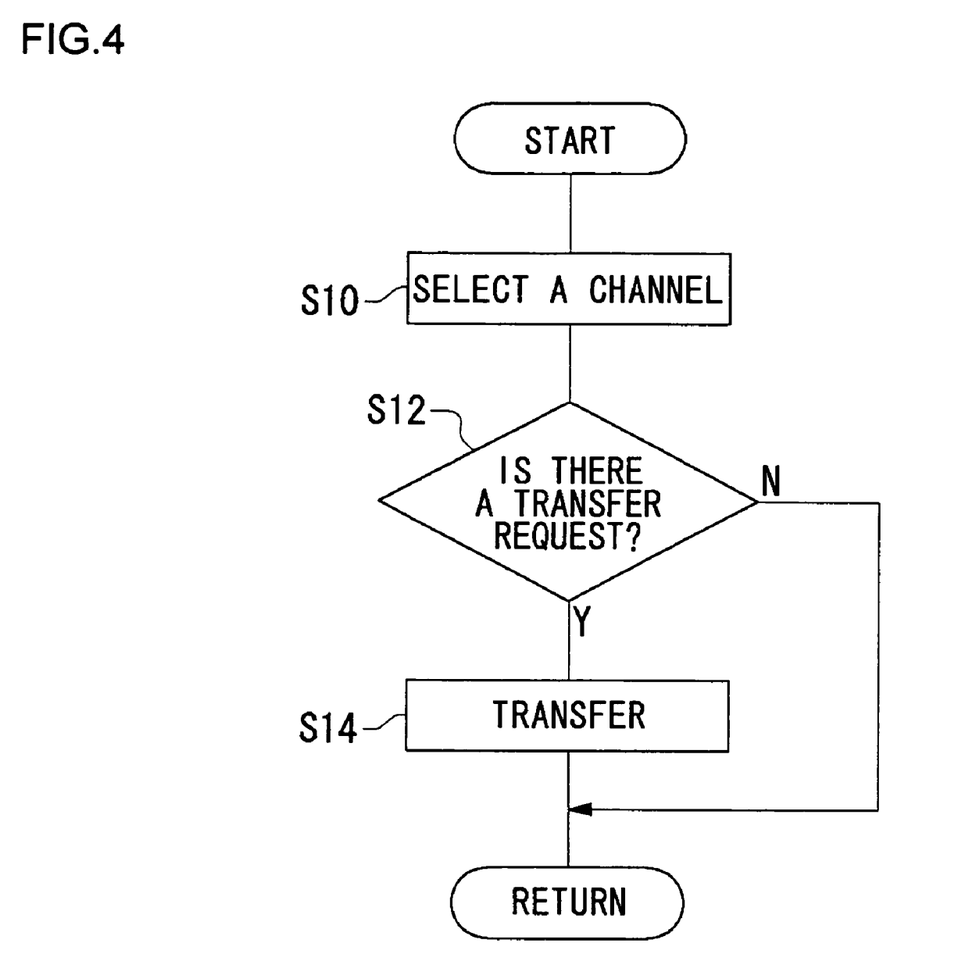
FIG. 4 is a flowchart showing a general process of a data transfer arbitration unit transferring data.

FIG. 4 is a flowchart showing a general process of a data transfer arbitration unit transferring data. The processing of S10 to S14 shown here is a loop processing, which is carried out repeatedly.

First, a selector 174 of a data transfer arbitration unit 172 selects any one of a plurality of channels (S10). For example, when the selection is to be made in a round-robin method, the selector 174 selects in the order of CH0 to CH3. If the DMAC 170 of the selected channel has data to be transferred (Y of S12), the transmitter 176 in the data transfer arbitration unit 172 transmits a data write command for said data to the control-side transfer unit 114 (S14). After the transmission, the processing returns to S10 again and the next channel is selected. If the DMAC 170 of the selected channel does not have data to be transferred (N of S12), the processing returns to S10 without performing the transmission processing, and the next channel is selected.

In this manner, once data of the basic transfer size, which is the amount of data to be transmitted in one time of transfer service, is transmitted, the next channel is selected. It is to be noted here that when the data whose transfer is requested in a selected channel is smaller than the basic transfer size, all of the data whose transfer is requested is transferred.

Figure 5:
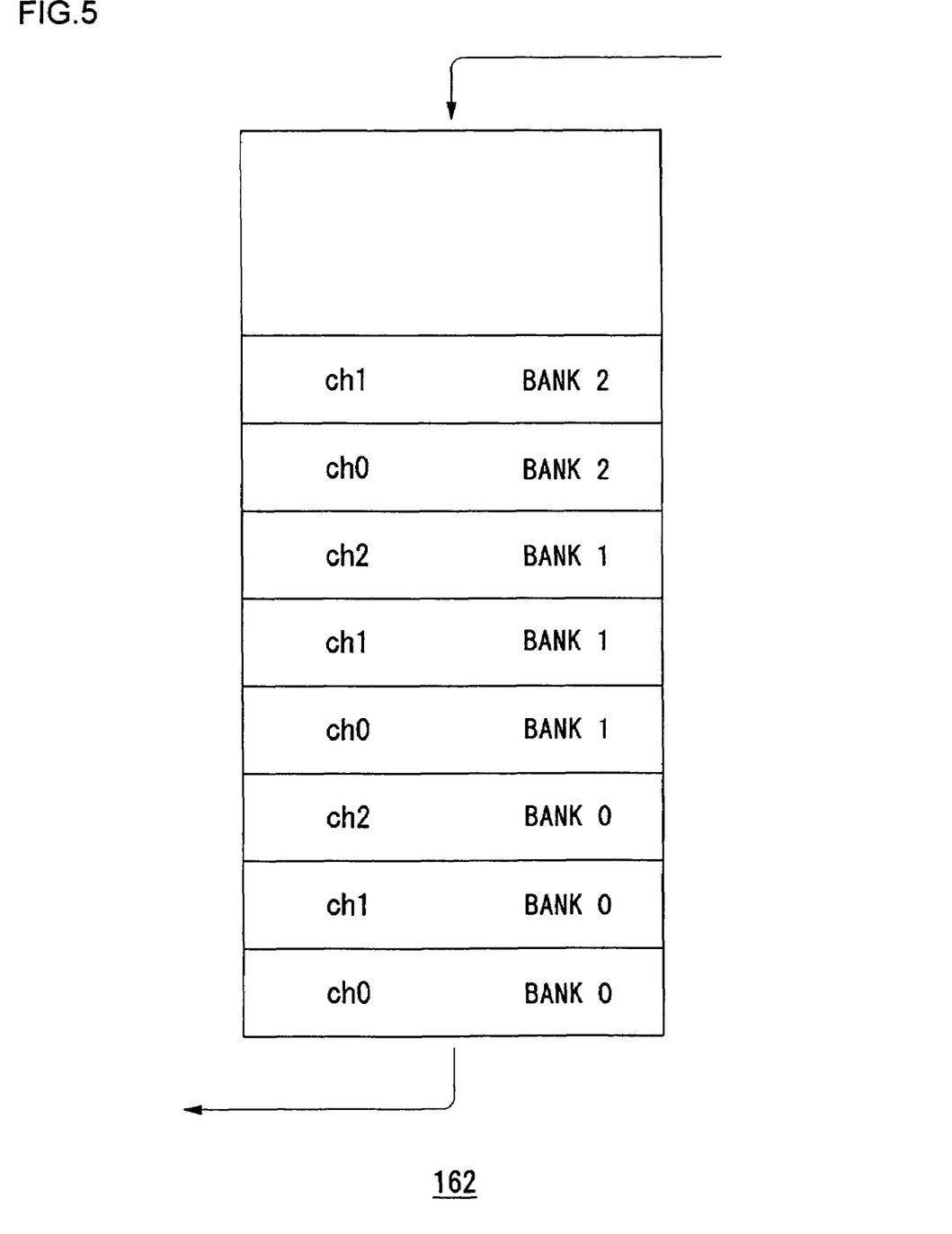
FIG. 5 is a schematic diagram to show a mode of data write commands that are stored in a write command storage unit by a processing shown in FIG. 4.

FIG. 5 is a schematic diagram to show a mode of data write commands that are stored in a write command storage unit by a processing as shown in FIG. 4.

It is assumed here that transfer requests for banks 0, 1 and 2 are issued from CH0, those for banks 0, 1 and 2 are issued from CH1 also, and those for banks 0 and 1 are issued from CH2. Hereinbelow, a data write command for data whose transfer is requested by CH1 for bank 0 as the write destination will be denoted by a channel as the transmission origin and a bank name as the write destination placed side by side, like "CH1:Bank 0".

According to the flowchart shown in FIG. 4, the selector 174 in the data transfer arbitration unit 172 makes selections in the order of CH0, CH1 and CH2, and therefore data are transferred in the order of "CH0:Bank 0", "CH1:Bank 0", "CH2:Bank 0", "CH0:Bank 1", . . . . The write command storage unit 162 stores the data write commands in this transfer order.

Hereinbelow, "write processing" in the following description means a processing from the time when data writing in a bank starts to the time when the next writing is possible. In other words, the execution time of a write processing is the time combining access time and delay time.

The memory controller 160 starts a write processing to the main memory 140 by taking out the oldest data write command of "CH0:Bank 0" in a FIFO method. Then the memory controller 160 takes out the data write command of "CH1:Bank 0". At this time, if the condition is not ready for the start of the next writing upon completion of the write processing for the data write command of "CH0:Bank 0", the memory controller 160 cannot start the data write processing of "CH1:Bank 0". Hence, the data write processing of "CH1:Bank 0" must wait for the completion of the data write processing of "CH0:Bank 0". Furthermore, the next data write command of "CH2:Bank 0", which is also a write request to bank 0, is also obliged to wait therefor.

As described above, in memory access with a plurality of channels in common systems, there are cases where accesses concentrate on a particular bank, thus dropping the processing efficiency of the memory controller 160.

As a method to cope with a condition like this, a method can be conceived in which after a readout of the data write command of "CH0:Bank 0", "CH0:Bank 1" is first read out in preference to "CH1:Bank 0" or "CH2:Bank 0". Hereinbelow, a processing method like this is called a "skipping method". According to a skipping method, a write processing to bank 1 can be started during the delay time of bank 0. Also, if the readout order is further changed such as to read out "CH0:Bank 2" following "CH0:Bank 1", then a write processing to bank 2 can be started subsequently even during the delay time of bank 1. And, if the first write processing to "CH0:Bank 0" is completed, a data write processing of "CH1:Bank 0" is started.

To lessen the effect of delay time at memory access, the order in which the memory controller 160 reads out data from the data storage unit 162 may be changed as appropriate like this, while employing a FIFO method basically.

With a skipping method, it is necessary that the memory controller 160 determines whether a skipping is executable or not. Yet, it is not desirable from the viewpoint of transfer throughput that such necessity places an excessive processing load on the memory controller 160.

Figure 6:
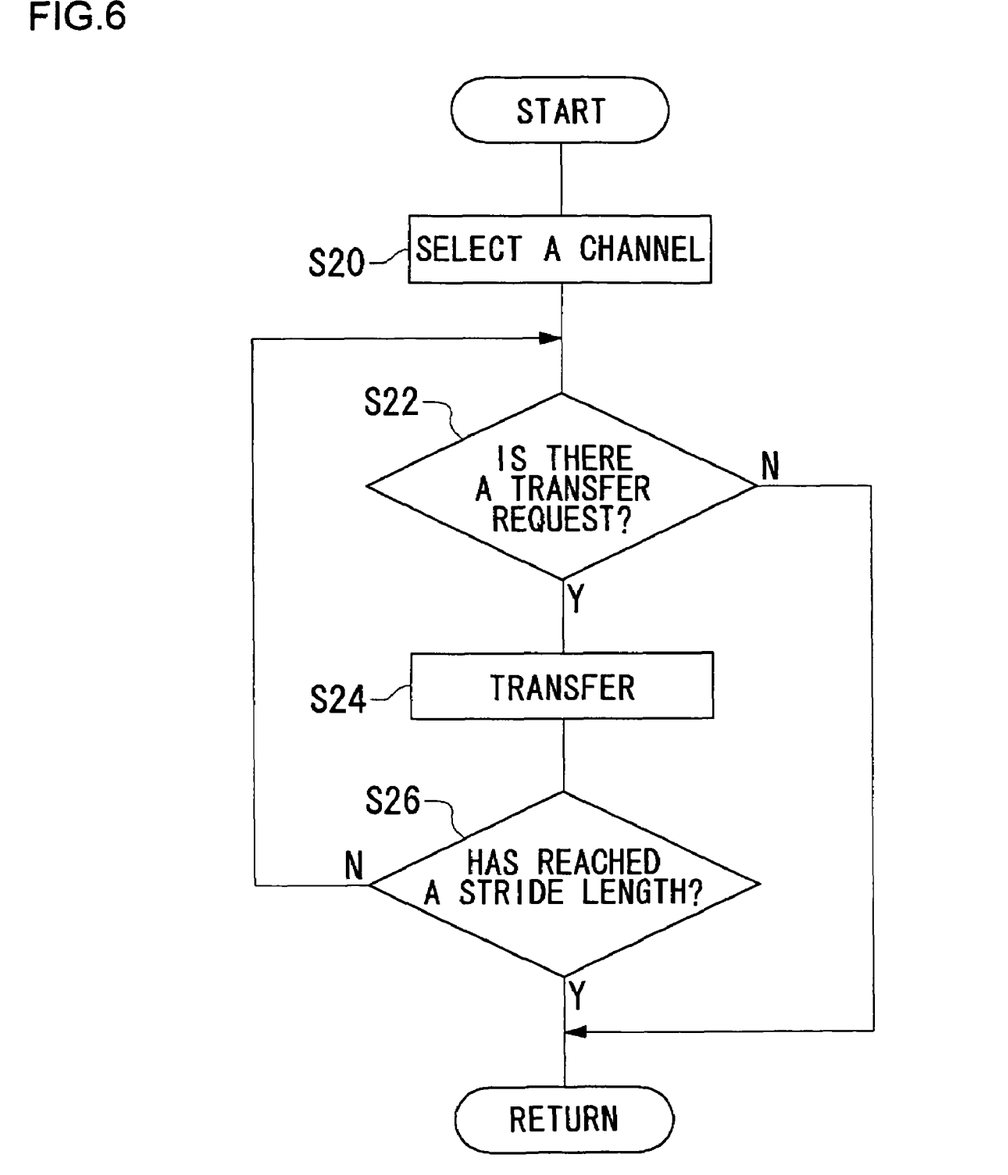
FIG. 6 is a flowchart showing a process of a data transfer arbitration unit transferring data in a memory access method according to an present embodiment.

FIG. 6 is a flowchart showing a process of a data transfer arbitration unit transferring data in a memory access method according to the present embodiment. The processing of the flow S20 to S24 shown here is also a loop processing, which is carried out repeatedly. Hereinbelow, the method explained with reference to FIG. 5 is called "the present method".

First, a selector 174 selects any one of the channels (S20). At this time, too, the selection can be made using a known selection method like a round-robin method, for instance. In addition, a DMAC 170 may be selected using an LRU (Least Recently Used) method, in which DMACs 170 are selected in the order of frequency with which data transfers have been requested in the past, or a random method, in which any of the DMACs 170 is selected at random.

If there is a data transfer request in the DMAC 170 of the selected channel (Y of S22), the transmitter 176 transmits a data write command therefor to the control-side transfer unit 114 (S24). At this point, when data are transmitted consecutively from the DMAC 170, the selector 174 determines whether the total size of the transferred data is reaching a predetermined stride length or not (S26). When it is not reaching the stride length (N of S26), the processing returns to S22. And if the DMAC 170 of a previously selected channel has a further data transfer request (Y of S22), data of the basic transfer size is transferred again from the same DMAC 170 (S24).

Or, when it has reached the stride length (Y of S26), the processing returns to S20 and the next DMAC 170 is selected. In other words, it is possible that data are transferred consecutively from the DMAC 170 of a selected channel, with the stride length as a limit. If the stride length is 2048 bytes, the basic transfer size is 128 bytes, and therefore it is possible that data are transferred consecutively from the same DMAC 170 a total of 16 times, which is 2048÷128. On the other hand, when the DMAC 170 of the selected channel is not requesting a data transfer (N of S22), the processing returns directly to S20 and the next channel is selected (S20).

Figure 7:
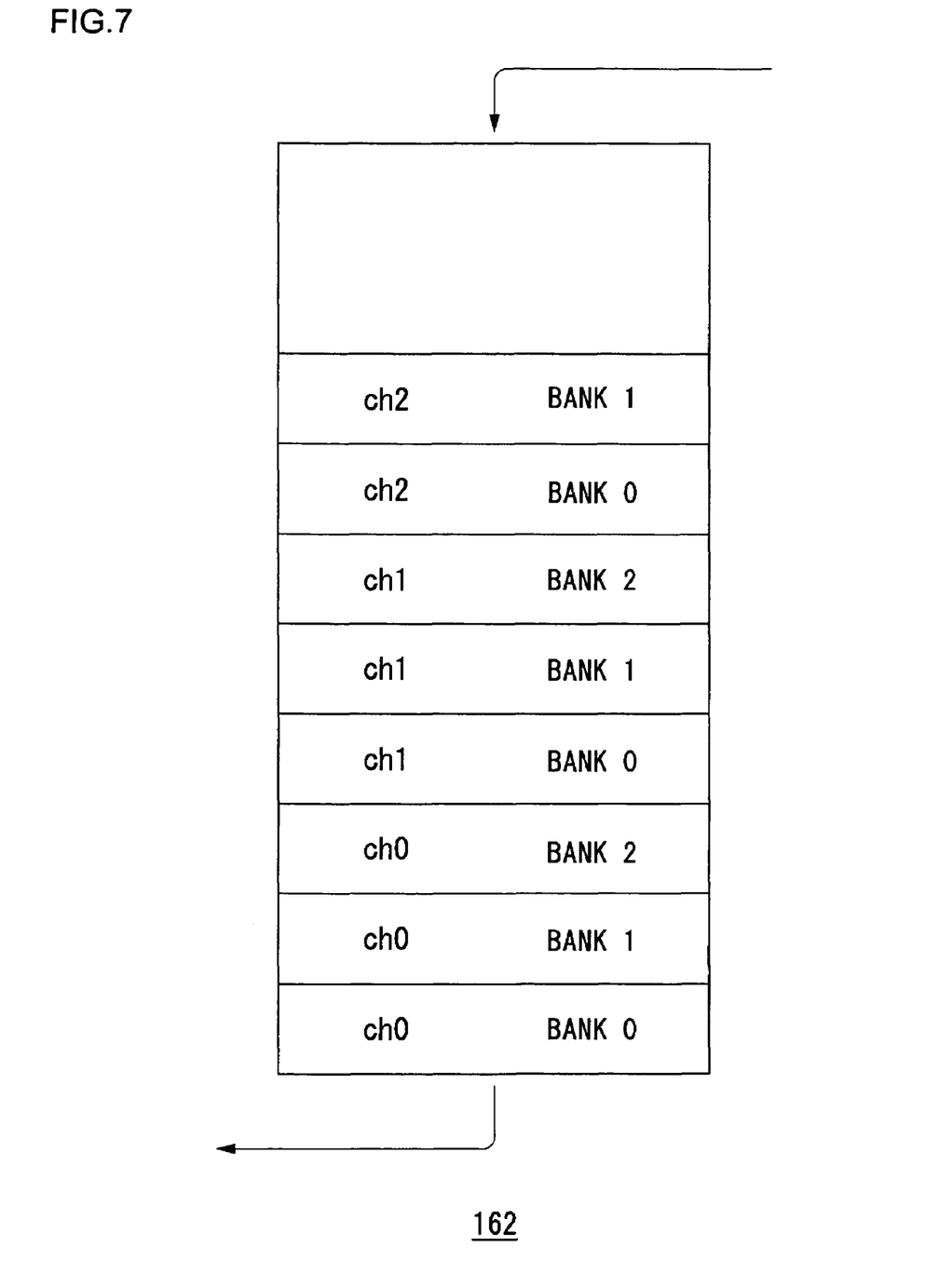
FIG. 7 is a schematic diagram to show a mode of transfer data that are stored in a write command storage unit by a processing shown in FIG. 6.

FIG. 7 is a schematic diagram to show a mode of transfer data that are stored in a write command storage unit by a processing as shown in FIG. 6.

According to the transfer method as shown in FIG. 6, there are two kinds of cases where another channel is selected after a channel is selected. In the first case, this happens when there is no longer data to be transferred from a selected channel. In this case, another channel is selected. In the other case, this happens when the total amount of data transferred consecutively from a selected channel has reached a stride length. In this case, too, another channel is selected. In the same way as with FIG. 5, it is assumed here that transfer requests for banks 0, 1 and 2 are issued from CH0, those for banks 0, 1 and 2 are issued from CH1 also, and those for banks 0 and 1 are issued from CH2. According to the flowchart shown in FIG. 6, the selector 174 selects CH1 after it has selected CH0 three times consecutively, so that data are transferred in the order of "CH0:Bank 0", "CH0:Bank 1", "CH0:Bank 2", "CH1:Bank 0", . . . . The data storage unit 162 stores the data in this transfer order.

The memory controller 160 starts a write processing to the main memory 140 by taking out the oldest data of "CH0:Bank 0". As a delay time begins in a write processing to bank 0, the data of "CH0:Bank 1" is taken out and a write processing to bank 1 is started. Then the data of "CH0:Bank 2" is taken out and a write processing to bank 2 is started. Thus, it is easier to lessen the effect of delay time of each bank while employing readout in an FIFO method.

Since addresses of data whose transfer is requested via a specific channel tend to be consecutive, the transfer method like this makes it easier to scatter accesses to the respective banks.

In addition to the round-robin method, random method and LRU method, which are methods without priority order for the selection by the selector 174 of DMACs 170, the following description is given additionally of a case where priority order is used.

Suppose, for example, that priority is given in the order of CH0, CH1, CH2 and CH3. In this case, if a data transfer request is being made by the DMAC 170 of CH0, the selector 174 selects CH0 with the highest priority. On the other hand, if a data transfer request is not being made by the DMAC 170 of CH0, the selector 174 checks to see if a data transfer request is being made by the DMAC 170 of CH1, which is given the second highest priority. Once CH0 is selected, the ranking of the selected CH0 is lowered temporarily and the priority order is changed to the order of CH1, CH2, CH3 and CH0. At this time, if a channel other than CH0 is selected, the priority order is changed back to CH0, CH1, CH2 and CH3. In this manner, the present method can be applied to cases where a priority order is set fixedly but it can be temporarily changed according to the state of selection (hereinafter called a "variable priority order method"). With a common method explained with reference to FIG. 4, if CH1 is selected while the priority order is CH1, CH2, CH3 and CH0, the priority order will be CH0, CH1, CH2 and CH3, so that the channel to be selected next will be CH0. With the present method, on the other hand, if CH1 is requesting a further data transfer after the selection of CH1, the CH1 will be selected again. As a result, it is easier to distribute accesses to the respective banks and lessen the effect of delay time of each bank.

Furthermore, the aforementioned "skipping method" may be used in combination with the present method. According to the present method, data are accumulated in such an order that the write command storage unit 162 can execute writing to a plurality of banks without interruption. It is because data are transferred by the data transfer arbitration unit 172 in such a way as to scatter accesses to the respective banks. Thus, the number of executions of skipping processing to be carried out by the memory controller 160 is reduced in comparison with the common processing method explained with reference to FIG. 4 and FIG. 5.

The size of the write command storage unit 162 is limited, and therefore when there is an accumulation of data write commands to a specific bank at the write command storage unit 162, accesses to the respective banks cannot be scattered even by the skipping method. In contrast thereto, the data transfer arbitration unit 172 according to the present method transfers data write commands in such a way as to distribute the accesses to the respective banks. Hence, arbitration of data write commands is carried out efficiently on the transmission side and the reception side, namely, by both of the data transfer arbitration unit 172 and the memory controller 160, thus further raising the efficiency of data memory access.

According to the present embodiment, the basic transfer size and the entry bit number of each bank are both 128 bytes. Accordingly, the image-processing-side transfer unit 122 and the control-side transfer unit 114 can handle data using a data block of 128 bytes as a unit, so that data can be handled smoothly between the control-side transfer unit 114 and the image-processing-side transfer unit 122. The stride length may be defined as the product of the number of banks and the entry bit number. With the present embodiment, the number of banks is 16 and the entry bit number is 128 bytes, so that the stride length is 2048 bytes.

It is desirable that the stride length be at least equal to or less than the product of the maximum number of data write commands storable in the write command storage unit 162 in the memory controller 160 and the basic transfer size. It is also desirable that the number of banks be equal to or less than the product of the maximum number of data write commands storable in the write command storage unit 162.

Also, when priority is given to the reduction of latency of data transfer for each DMAC 170, the chances of transfer service provision may be allotted relatively equally to the respective DMACs 170 by shortening the stride length. On the contrary, when emphasis is placed on the throughput of a plurality of DMACs 170 as a whole, a processing may be so implemented as to facilitate the distribution of accesses to the respective banks by setting the stride length longer.

When the addresses of the data write destinations of each channel are distributed among the addresses of one round of all the banks, the stride length may be set shorter properly. For example, in the case of FIG. 3, it is when there is a distribution among the addresses equal to 2048 bytes. In such a case, it is considered that the condition is primarily conducive to the scattering of accesses to the respective banks even if no arrangement is made to facilitate a consecutive selection of a specific channel by setting the stride length longer. The data transfer arbitration unit 172 may read in advance the data write destination address from each DMAC 170 and increase or decrease the stride length according to the above-mentioned guidelines.

When there are only a few DMACs 170 requesting data transfer, the stride length may be set longer in the run time. In such a case, it is because even when a DMAC 170 is selected and then another DMAC 170 is selected, the previously selected DMAC 170 must wait but only for a short time before it is selected in the next time. In other words, even when a specific DMAC 170 is selected consecutively, there will hardly be a condition in which another DMAC 170 has to wait an excessively long time before it receives a transfer service.

Note that when a competition between banks has occurred, that is, when data write requests have come consecutively to a specific bank, the minimum value of the stride length may be determined based on the delay time, which occurs as a time from the end of previous write to the start of next write, and the latency, which occurs with a changeover occurring when a bank is accessed and then another bank is accessed. Suppose that the delay time when a competition between banks has occurred is 100 nanoseconds. Also suppose that the latency occurring when another bank is accessed is 20 nanoseconds. In this case, from 100÷20=5, "basic transfer size×5 times" may be set as the minimum stride length.

As described above, the present embodiment makes it easier to prevent a concentration of accesses to a specific bank when a write processing of data to the main memory 140 is done in a memory interleave system. Hence, the effect of delay time in a write processing to a bank is lessened and memory access is carried out more efficiently. Also, an arrangement can be made such that many data write commands are issued consecutively from a specific DMAC 170, whereas, on the other hand, an arrangement can be made such that chances of getting transfer service per unit time may be given evenly to a plurality of DMACs 170 by setting an upper limit to the number of consecutive selections of a specific channel by the stride length.

It is also a characteristic of DRAM that when the read from and the write to the main memory 140 are executed alternately, the processing of the read-write changeover becomes an overhead, which serves as a factor worsening the memory access efficiency. On the other hand, there is a tendency that data write commands or data read commands are transmitted consecutively from a specific DMAC 170. According to the present method, an arrangement can be made such that data write commands or data read commands are transferred consecutively from a specific DMAC 170, so that the overhead due to such a read-write changeover can be reduced.

For the present embodiment, the description has so far centered around the processing of transferring commands to instruct data write from DMACs 170 to the control-side transfer unit 114. It goes without saying that the scope of the present invention is not limited thereto. Even when a command to instruct data read is transferred from DMACs 170 to the control-side transfer unit 114, the data transfer arbitration algorithm described in the present embodiment will work effectively and produce similar effects.

The present invention has been described based on the embodiments. These embodiments are merely exemplary, and it is understood by those skilled in the art that various modifications to the combination of each component and process thereof are possible and that such modifications are also within the scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A data transfer arbitration apparatus in which data to be recorded are sequentially transferred to a memory controller that records data in memory having a plurality of banks, the apparatus comprising:
   a selector which selects a data transfer requesting entity from among a plurality of data transfer requesting entities, irrespective of priority sequence of transfer service for the data transfer requesting entity; and
   a transmitter which transmits, to the memory controller, data requested to be transferred by the selected data transfer requesting entity,
   wherein:
   said selector selects consecutively the data transfer requesting entity so that the transfer service for the same data transfer requesting entity is consecutively executed, and determines the number of consecutive selections in a manner that a product of a bit number of data transmitted by one transfer service and the number of consecutive selections is less than or equal to predetermined stride length so that a transfer across the banks of the memory occurs by a plurality of the transfer services; and
   when data write destinations which have been read in advance are not consecutive among the addresses of one round of all the banks, the stride length is shortened from maximum stride length, the maximum stride length being defined as a product of the number of the banks and the entry bit number of each bank.

2. A data transfer arbitration apparatus according to claim 1, wherein an entry bit number of a bank is identical to the bit number of data transmitted by one transfer service to the data transfer requesting entity.

3. A data transfer arbitration apparatus according to claim 1, wherein said selector selects the data transfer requesting entity by using any selection method at least among a round-robin method, an LRU (Least Recently Used) method, a random method and selection method according to priority order.

4. A data transfer arbitration apparatus according to claim 1, wherein the stride length is defined as a product of the number of banks and an entry bit number.

5. A data transfer arbitration apparatus in which data to be recorded are sequentially transferred to a memory controller that records data in memory having a plurality of banks, the apparatus comprising:
   a selector which selects a data transfer requesting entity from among a plurality of data transfer requesting entities, according to priority sequence of transfer service determined for the plurality of data transfer requesting entities; and
   a transmitter which transmits, to the memory controller, data requested to be transferred by the selected data transfer requesting entity,
   wherein:
   when the data transfer requesting entity requests another data transfer after having received a transfer service, said selector selects consecutively the data transfer requesting entity after having received the transfer service, even if there exists a data transfer requesting entity which is supposed to receive a transfer service next time according to the priority sequence, and determines the number of consecutive selections in a manner that a product of the bit number of data transmitted by one transfer service and the number of consecutive selections is less than or equal to predetermined stride length so that a transfer across the banks of the memory occurs by a plurality of the transfer services; and
   when data write destinations which have been read in advance are not consecutive among the addresses of one round of all the banks, the stride length is shortened from maximum stride length, the maximum stride length being defined as a product of the number of the banks and the entry bit number of each bank.

6. A data transfer arbitration apparatus according to claim 5, wherein an entry bit number of a bank is identical to the bit number of data transmitted by one transfer service to the data transfer requesting entity.

7. A data transfer arbitration apparatus according to claim 5, wherein the stride length is defined as a product of the number of banks and an entry bit number.

8. A data transfer arbitration method in which when data transfer requests are issued, in parallel, from a plurality of data transfer requesting entities to memory having a plurality of banks, a transfer service is sequentially provided to the data transfer requesting entities, the method characterized in that
   a data transfer requesting entity is consecutively selected from among the plurality of data transfer requesting entities so that the transfer service for the data transfer requesting entity is performed consecutively a predetermined number of times, irrespective of priority sequence of transfer service for the data transfer requesting entity, and the predetermined number of times is determined so that a transfer across the banks of the memory occurs by a plurality of the transfer services,
   wherein:
   the number of consecutive selections is determined in a manner that a product of a bit number of data transmitted by one transfer service and the number of consecutive selections is less than or equal to predetermined stride length; and
   when data write destinations which have been read in advance are not consecutive among the addresses of one round of all the banks, the stride length is shortened from maximum stride length, the maximum stride length being defined as a product of the number of the banks and the entry bit number of each bank.

9. A data transfer arbitration method according to claim 8, wherein an entry bit number of a bank is identical to a bit number of data transmitted by one transfer service to the data transfer requesting entity, and the transfer service to the same data transfer requesting entity is consecutively performed at least twice.

10. A data transfer arbitration method according to claim 8, wherein a data transfer requesting entity to which the transfer service is to be provided is selected using any selection method at least among a round-robin method, an LRU method and a random method.

11. A data transfer arbitration method according to claim 8, wherein the stride length is defined as a product of the number of banks and an entry bit number.

12. A data transfer arbitration method in which when data transfer requests are issued, in parallel, from a plurality of data transfer requesting entities to memory having a plurality of banks, a transfer service is sequentially provided to the data transfer requesting entities, the method characterized in that a data transfer requesting entity is selected from among the plurality of data transfer requesting entities, according to priority sequence of transfer service determined for the plurality of data transfer requesting entities, so as to perform the transfer service, and when the data transfer requesting entity requests another data transfer after having received the transfer service, the data transfer requesting entity is consecutively selected so that the transfer service to the data transfer requesting entity after having received the transfer service is consecutively performed, even if there exists a data transfer requesting entity which is supposed to receive a transfer service next time according to the priority sequence, and the number of consecutive selections is determined in a manner that a product of a bit number of data transmitted by one transfer service and the number of consecutive selections is less than or equal to predetermined stride length so that a transfer across the banks of the memory occurs by a plurality of the transfer services, wherein when data write destinations which have been read in advance are not consecutive among the addresses of one round of all the banks, the stride length is shortened from maximum stride length, the maximum stride length being defined as a product of the number of the banks and the entry bit number of each bank.

13. A data transfer arbitration method according to claim 12, wherein an entry bit number of a bank is identical to a bit number of data transmitted by one transfer service to the data transfer requesting entity, and the transfer service to the same data transfer requesting entity is consecutively performed at least twice.

14. A data transfer arbitration method according to claim 12, wherein the stride length is defined as a product of the number of banks and an entry bit number.

15. A recording medium, readable by a computer, on which a data transfer arbitration program is stored and on which a set of instructions is stored for causing the computer, when data transfer requests are issued, in parallel, from a plurality of data transfer requesting entities to memory having a plurality of banks, to execute the data transfer arbitration program for sequentially providing a transfer service to the data transfer requesting entities by causing the computer to perform steps comprising:

consecutively selecting a data transfer requesting entity from among the plurality of data transfer requesting entities so that the transfer service for the data transfer requesting entity is performed consecutively a predetermined number of times, irrespective of priority sequence of transfer service for the data transfer requesting entity, and determining the predetermined number of times so that a transfer across the banks of the memory occurs by a plurality of the transfer services, wherein:

the number of consecutive selections is determined in a manner that a product of a bit number of data transmitted by one transfer service and the number of consecutive selections is less than or equal to predetermined stride length; and when data write destinations which have been read in advance are not consecutive among the addresses of one round of all the banks, the stride length is shortened from maximum stride length, the maximum stride length being defined as a product of the number of the banks and the entry bit number of each bank.

16. A recording medium, readable by a computer, according to claim 15, wherein the stride length is defined as a product of the number of banks and an entry bit number.

17. A recording medium, readable by a computer, on which a data transfer arbitration program is stored and on which a set of instructions is stored for causing the computer, when data transfer requests are issued, in parallel, from a plurality of data transfer requesting entities to memory having a plurality of banks, to execute the data transfer arbitration program for sequentially providing a transfer service to the data transfer requesting entities by causing the computer to perform steps comprising:

selecting a data transfer requesting entity from among the plurality of data transfer requesting entities, according to priority sequence of transfer service determined for the plurality of data transfer requesting entities, so as to perform the transfer service, consecutively selecting the data transfer requesting entity when the data transfer requesting entity requests another data transfer after having received the transfer service, so that the transfer service to the data transfer requesting entity after having received the transfer service is consecutively performed, even if there exists a data transfer requesting entity which is supposed to receive a transfer service next time according to the priority sequence, and determining the number of consecutive selections in a manner that a product of a bit number of data transmitted by one transfer service and the number of consecutive selections is less than or equal to predetermined stride length so that a transfer across the banks of the memory occurs by a plurality of the transfer services, wherein when data write destinations which have been read in advance are not consecutive among the addresses of one round of all the banks, the stride length is shortened from maximum stride length, the maximum stride length being defined as a product of the number of the banks and the entry bit number of each bank.

18. A recording medium, readable by a computer, according to claim 17, wherein the stride length is defined as a product of the number of banks and an entry bit number.

* * * * *